Figure 1:
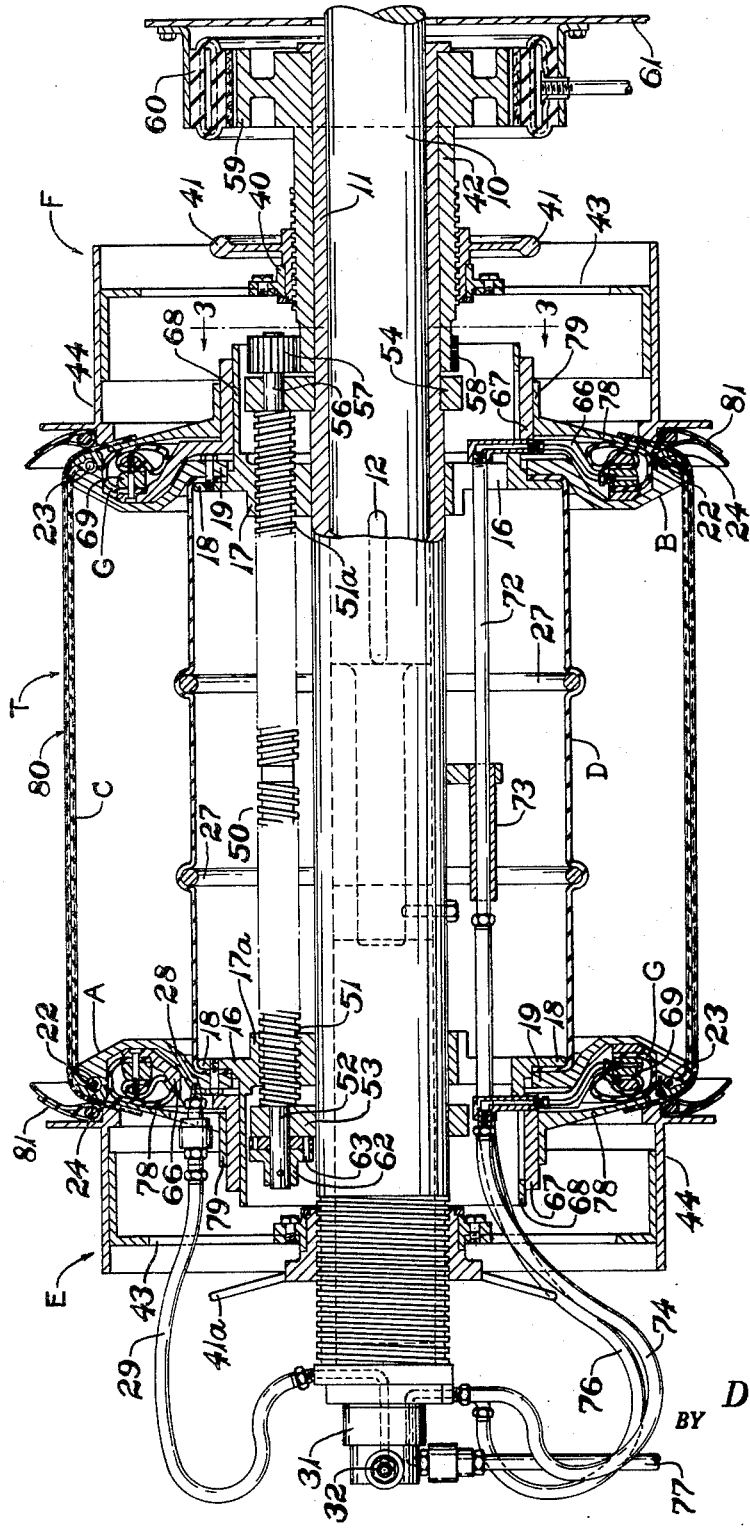

March 31, 1964  D. K. PORTER  3,127,294
METHOD AND APPARATUS FOR BUILDING TIRES
Filed Feb. 19, 1958  4 Sheets-Sheet 1

INVENTOR.
DONALD K. PORTER
BY C. E. Tripp
ATTY.

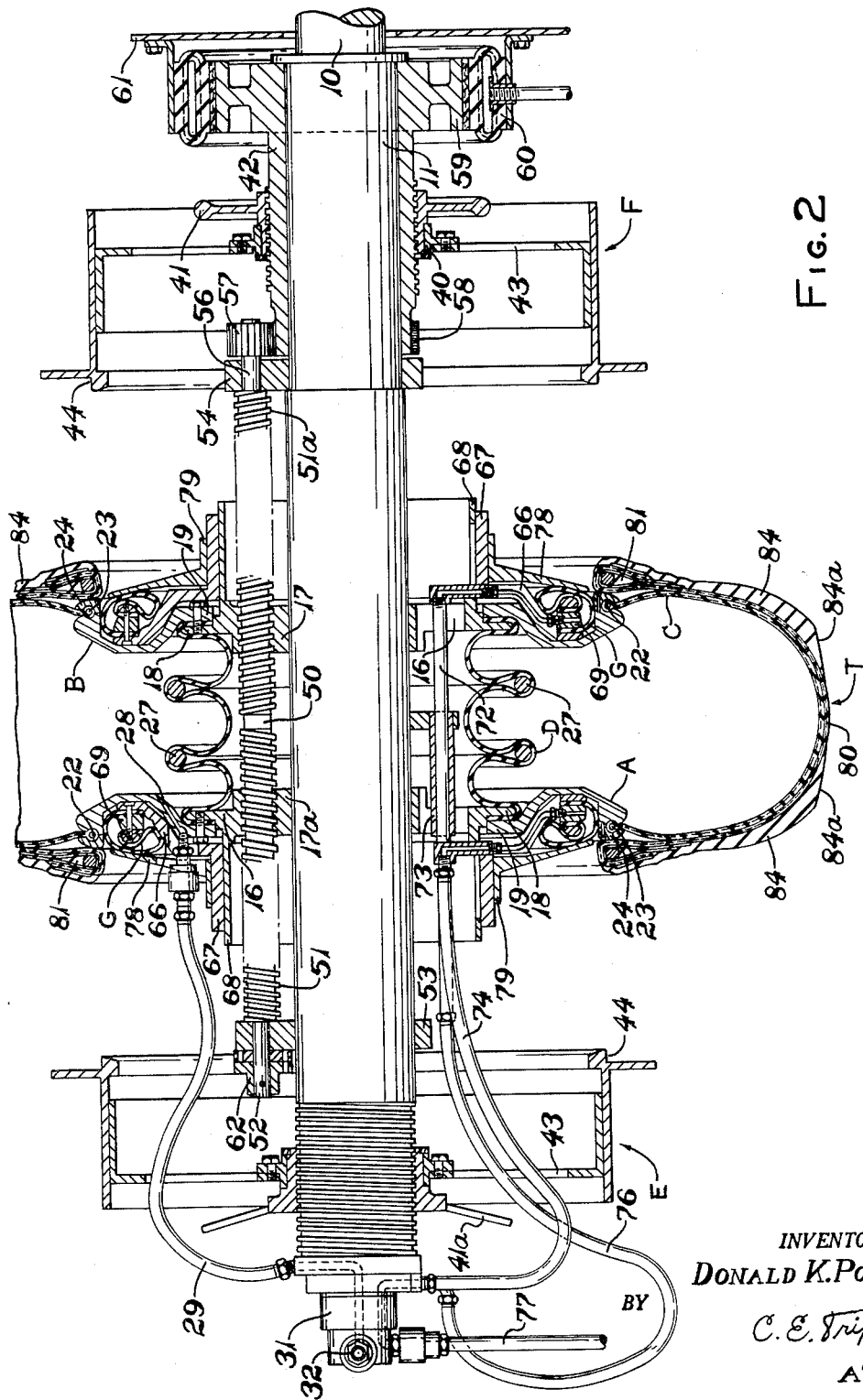

March 31, 1964   D. K. PORTER   3,127,294
METHOD AND APPARATUS FOR BUILDING TIRES
Filed Feb. 19, 1958   4 Sheets-Sheet 3
Fig. 4
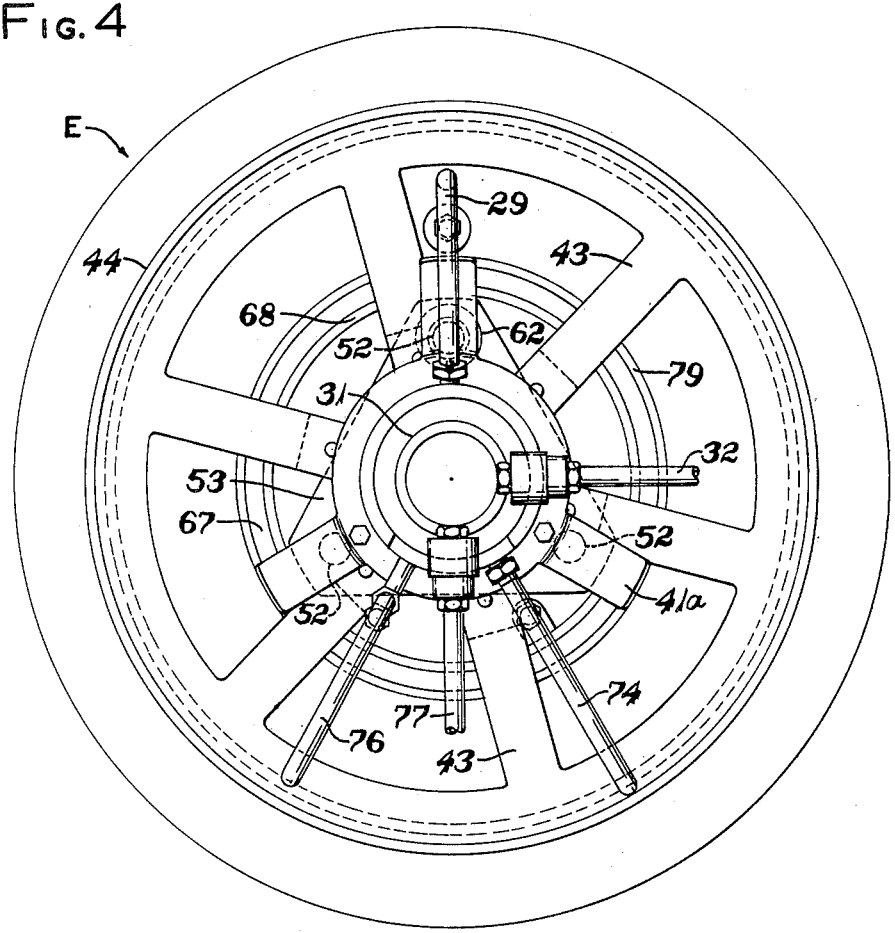
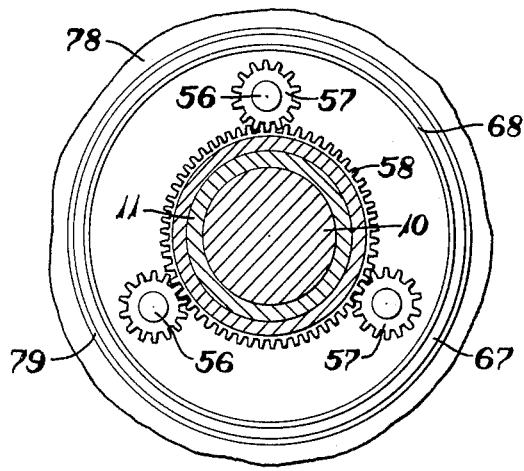
Fig. 3
INVENTOR.
DONALD K. PORTER
BY C. E. Tripp
ATTY.

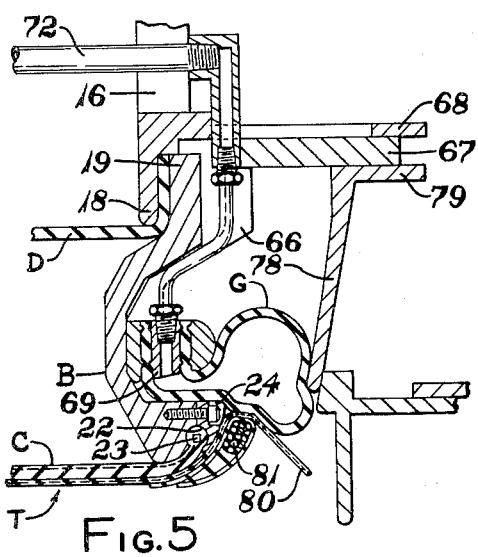
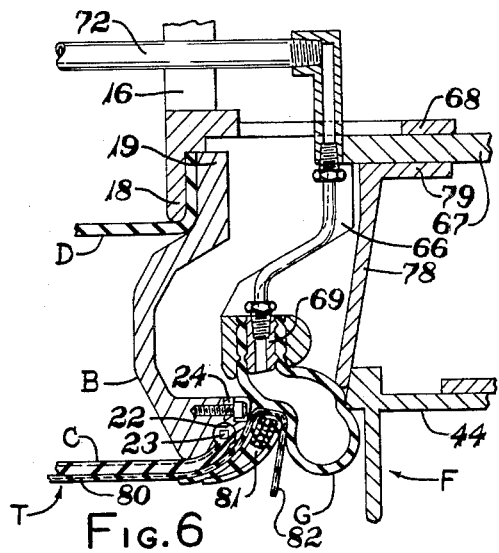
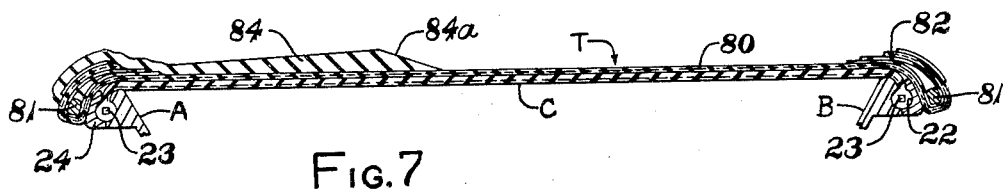
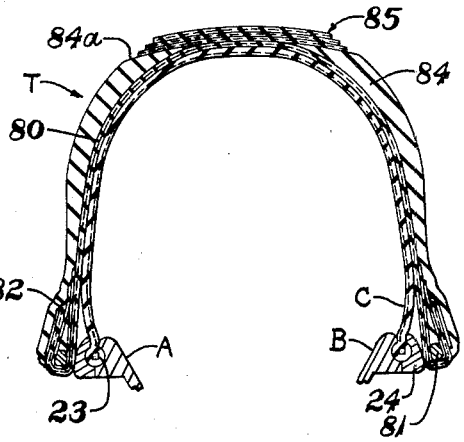
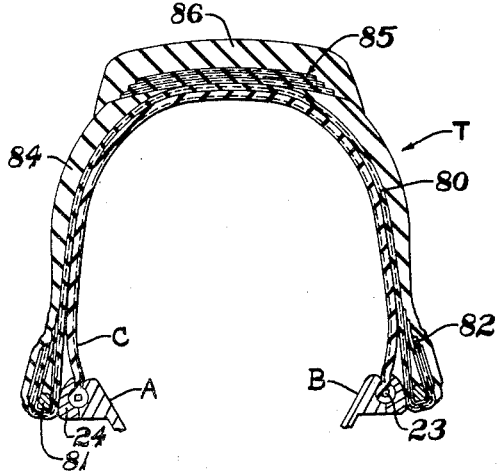
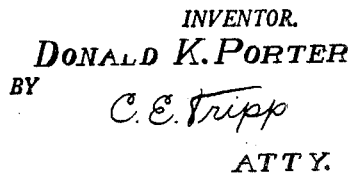

3,127,294
METHOD AND APPARATUS FOR
BUILDING TIRES
Donald K. Porter, Cuyahoga Falls, Ohio, assignor to The
B. F. Goodrich Company, New York, N.Y., a corporation of New York
Filed Feb. 19, 1958, Ser. No. 716,075
10 Claims. (Cl. 156—131)

This invention relates to a method and apparatus for the drum building of pneumatic tires and it is particularly useful in connection with the building of such tires wherein the crown of the shaped tire includes a circumferentially inextensible overhead band. Green tires of this type cannot be completely assembled on a flat drum and then expanded or shaped for placement in the mold because the overhead is virtually inextensible. The apparatus of this invention is of the general type wherein a rubber bladder bridges axially movable flanges. The carcass ply or plies of the tire are laid on the bladder with the flanges separated to place the bladder in a cylindrical condition. The beads are set, the carcass plies turned up around the beads and the sidewall rubber is applied. Then the flanges are brought together, and the bladder is inflated to serve as a support for applying the circumferentially inextensible overheads and the tread crown rubber with the tire expanded to substantially its final circumference.

The apparatus of this invention is almost entirely self-contained and can be slipped on the projecting drum shaft of an ordinary tire building machine, parts of the apparatus being operated by rotation of the tire building machine shaft. No external supports are required during the tire building operation. This is accomplished by a novel arrangement of the side flanges, their support drives, screws and gearing which permits the entire assembly to be built within the axial length of the usual tire building machine drum supporting shaft.

Another feature of the invention is a construction that reduces axial pneumatic separating forces on the mechanical parts when the bladder is inflated and which completely eliminates the need for rotary or sliding seals at the bladder support structure. This is accomplished by providing an auxiliary inner bladder which bridges the side flanges just within the main bladder, which auxiliary bladder is allowed to fold up as an accordion when the flanges are brought together and which leaves but a small area of the flanges exposed to axial pneumatic pressure after bladder inflation.

Another feature of the invention permits turning up the carcass plies about the beads firmly and smoothly, which is accomplished by a pair of inflatable annular tubes properly placed and backed up at each side flange which tubes expand when inflated to press the turn ups against the beads.

In tires wherein the main carcass ply has one or more layers of radial cords, expansion of the carcass during shaping causes appreciable separation of the cords at the crown of the tire. This separation must be carefully controlled for each design and it is a feature of this invention that the bladder supporting side flanges are constructed for ready removal and substitution to facilitate adjustment of the diameter of the bladder upon which the carcass ply or plies are laid relative to the diameter of the tire beads set against the bead shoulders on the flanges.

In the method of the invention, the sidewall strips are applied separately from the tread and overheads and are placed while the bladder flanges are separated and the bladder is in substantially cylindrical form. The flanges are then brought together and the overheads and tread crown rubber are applied. The pressure is gradually increased in the bladder as the flanges are brought together so that shaping of the tire is effected substantially uniformly and there is no tendency to pull the beads into an eccentric position. The sidewall rubber material can be formed with shoulders to smoothly join the overhead and tread material, which material can be accurately centered relative to the completed tire by use of a centerline marker. This accurate centering may not be as easy to attain when the sidewall rubber is applied with the tread rubber and overheads after the carcass is shaped, because even if the overheads are centered on the carcass, the sidewalls project past the shaped carcass and it is difficult to apply them perfectly. When the sidewalls are stitched down around the carcass, in their cylindrical condition as in this invention, they can be centered independently of the overheads and tread and the tread can be centered relative to the shaped tire independently of the sidewall positioning. Also, the fact that the overheads and crown tread rubber are applied separately from the sidewall rubber strips greatly facilitates the application of the overhead and tread rubber elements as continuous bands using a roller bar, as opposed to applying the tread rubber and overheads as strips with the tread rubber unitary with the sidewall material.

The manner in which these and other advantages may be obtained will be apparent to one skilled in the art from the following detailed description of a preferred embodiment of the invention.

In the drawings:
FIG. 1 is a section through the apparatus with the flange members in their separated position;
FIG. 2 shows the flange members brought together to shape the tire;
FIG. 3 is a partial section taken on 3—3 of FIG. 1 showing the drive gears;
FIG. 4 is an outer end view of the apparatus;
FIGS. 5 and 6 are fragmentary sections at one of the flanges at two successive stages in the turn up operation;
FIGS. 7–9 show diagrammatically various steps in the tire building operation, most of the apparatus being omitted.

As seen in FIGS. 1 and 2, the entire apparatus is mounted on the protruding shaft end 10 of a conventional tire building machine. This shaft is mounted for controlled rotation on the usual frame (not shown) by means of a structure well-known in the art, such structure forming no part of the invention. The main support for the apparatus of the invention is an elongated sleeve 11 that is keyed to the shaft by key 12. The bladder-supporting side flanges A and B clamp the outer or building bladder C and the inner air-containing bladder D, these parts forming an inflation chamber. Each flange is mounted on a collar 16 that slides on the sleeve 11. Nuts 17 and 17a of opposite hand are formed on collars 16, which collars include projecting flanges 18 for receiving the edges of the inner bladder D to clamp them against flanges 19 on flanges A and B. The flanges A and B are peripherally grooved as at 22 to receive the reinforced beads 23 of the outer bladder C. A complementary grooved clamp ring 24 clamps the outer side of the bladder beads and also serves as a tire bead receiving shoulder during the building operation. To prevent complete collapse of the inner bladder D, rings 27 are provided. An inflation port 28 is formed in flange A for access to the interior of the air chamber formed by the two bladders and the side flanges A and B. Inflation port 28 is connected by hose 29 to a rotary joint fitting 31 on the free end of sleeve 11, which receives compressed air or vacuum from supply line 32.

The bead-setting structure comprises opposed members E and F slidably mounted at opposite sides of the flanges A and B. The bead-setting ring F is mounted on a collar 40 rotatable on handwheel nut 41 that is threaded on a hub 42. Spokes 43 project from the hub and support the bead-setting ring 44. The bead-setting structure E functions in the same manner as that of the bead-setting structure F, except the handwheel nut 41a is threaded directly on sleeve 11.

The flanges are separated and brought together by means of screws 50 which have threads 51 and 51a of opposite hand running in the nuts 17 and 17a in the flanges 16. The outer ends 52 of the screws are rotatably supported by the end plate 53 fixed to sleeve 11 and a similar plate 54 fixed to the support sleeve 11 mounts the inner ends 56 of the screws. In order to drive the screws by rotation of the tire building drum shaft, their inner ends 56 have planet gears 57 keyed thereto. A sun gear 58 engages the planet gears and is formed on the hub 42 that is rotatably mounted on the sleeve 11. Hub 42 is formed at its inner end with a brake hub 59 which is surrounded by an expander tube brake 60 mounted on frame support 61. The brake 60 is a known article of commerce the structural details of which are not important to the invention. The outer end of one of the screws carries a lock collar 62 slidable on and keyed to the end of the screw and from which projects a pin 63. Mating holes are drilled in the adjacent fixed flange 53 so that when the lock collar is shifted axially to the right and clamped into place by a set screw, the lead screws cannot turn.

The operation of the gearing will now be explained. With lock collar 62 shifted left and with brake 60 applied to the sun gear hub, the latter is stationary. Now, rotation of the building drum shaft, sleeve 11 and flanges 53, 54 carries the screws and the planet gears around the sun gear which is fixed by the brake. This rotation will either separate or bring together the flanges A and B depending upon the direction of rotation given to the drum shaft. When the flanges have reached their desired position, the brake is released and the lock collar 62 is applied to maintain that position.

When the brake 60 is released, hub 42 is free to rotate with the rest of the structure and locking collar 62 can be shifted to the right to lock the screws in place.

The inflatable carcass turn up assembly will now be described. A pair of right and left flanges 66 have hubs 67 slidable on cylindrical extensions 68 of the collars 16. At the periphery of each flange 66 a rubber turn up bag or tube G is clamped against a spacer 69. As seen in FIGS. 5 and 6, inflation tubes connect to spacers 69. The right-hand tube (FIG. 1) connects to a pipe 72 slidable in a sleeve 73 and terminating in a hose 74 that leads to rotary joint. The other tube connects to hose 76 that also leads to the rotary joint. Air supply 77 is provided for the tubes.

Tube back up plates or flanges 78 have hubs 79 slidable on hubs 67 of the collars 16 for the bladder flanges A and B, the position of the back up plates or flanges being adjustable by means of the bead-setting rings E and F.

The bladders C and D are formed of two plies of rubberized cord material of gauge suitable for the size of the apparatus. I have found that the cords of these plies, particularly that of the outer bladder C, should be positioned at a high cord angle of about 85°, in other words, the cords are very nearly radial. The bag C may be covered with slippery rubber such as neoprene to facilitate removing the tire.

In explaining the use of the apparatus in performing the tire building method, a tire of a certain construction will be described and used as an example, it being understood, however, that the invention is not limited to a tire having all the details of this example.

The uncured green tire T under consideration is seen in FIG. 9. It has a single carcas ply 80, the cords of which are radial or nearly radial and inextensible beads 81, that include fill gum and a flipper strip. The carcass ply is turned up about the beads as at 82. Sidewall rubber material 84, overheads 85 and tread rubber 86 of wear-resistant rubber are applied to the carcass and the crown. Three overheads 85 are shown surrounding the carcass material underneath the tread. These overheads 85 are formed by means not forming part of this invention so that they are circumferentially inextensible or almost inextensible bands.

A brief step-by-step operation of the preferred method of building a tire of the type just described will now be explained. The apparatus is operated to separate the flanges A and B until the bladder C is cylindrical. Inflation air at low pressure is applied into the chamber between the bladders C and D. For example, with a 20 inch bead diameter tire having a shaped section width of 24 inches, this pressure will be in the order of 4 ounces per square inch.

The beads 81 will have previously been applied to their seats on bead setters E and F, the inner bead being slipped over the bag when it is partially collapsed.

As seen in FIG. 1 the carcass ply or plies 80 are laid on the bag or bladder C with the reinforcing cords extending substantially parallel with the axis of the bag or bladder, the edges of the ply are turned down, and the beads 81 set by manipulating bead setter handwheels E and F. The bead setters are retracted partially, as seen in FIG. 5, whereupon air pressure is supplied to tubes G. The tubes work their way out of their pockets between the beads and back up plates or flanges 78, which are forced against and backed up by the bead setters E and F. The position of the bead setters is adjusted so that as pressure in the tubes G increases, the tubes lift the turn ups 82 around the beads 81 and press them firmly and smoothly around the corner of the beads, as in FIG. 6. The tubes G are next vacuum-retracted into their pockets and the bead setters moved further away from the tire, permitting plates or flanges 78 and tube carriers 66 and tubes G to slide away from the tire beads.

The building drum is rotated with brake 60 released to stitch down the edges of the turn ups. As seen in FIG. 7, retaining strips of square-woven fabric may be applied to firmly hold the turn ups in place.

Next the pair of sidewall rubber strips 84 are applied, only the left one being in place in FIG. 7. These form shoulders 84a, FIG. 7, to guide further operations and to provide a gum wedge under the overheads and tread to be applied.

The tire is now ready for the overheads, which must be applied with the carcass expanded. Locking collar 62 is moved to free the screws 50 and brake 60 is set. The drum shaft 10 is turned in a direction to cause the flanges A and B to move together as in FIG. 2 and air pressure is simultaneously introduced to inflate bag C to the position of FIG. 8. With the tire size mentioned, pressure in the bag will be about 10 p.s.i. The brake is then released and the screws locked.

The overheads 85 are next applied in sequence and stitched down. They extend partially over sidewall shoulders 84a as seen in FIG. 8.

The band or length of tread rubber 86 is next laid on the overheads and stitched down, completing the building operation.

A vacuum is applied to the chamber between the bladders C and D and the inner bead of the tire is buttonholed over flanges A and B to remove the tire. Flanges A and B may be further separated at this stage if the bag C is too wrinkled or otherwise interferes with removal of the inner bead.

Thus, it can be seen that a self-contained apparatus is provided that slips over the usual shaft of a building drum. No sliding seals or pistons are needed and air pressure tending to spread flanges A and B acts over a relatively small area.

The tire ply turn ups are made smooth and tight by means of tubes G, so that the beads are uniform and do not cock or become eccentric during building as is the case when there is localized application of turn up forces. The turn up forces can be adjusted both by positioning the bead setter rings E and F and by adjusting the air pressure applied to the tubes G.

In order to accommodate different bead sizes, flanges A and B can be removed and replaced with other sizes for different size bags C.

The application of the sidewall rubber to the carcass while the latter is in its cylindrical shape permits better visibility for proper location of the material and the stitching down thereof is facilitated. Moreover, shoulders 84a of the sidewall rubber assist in guiding the placement of the overheads and cushioning their edges.

Having completed a detailed description of a preferred embodiment of my invention so that one skilled in the art may practice the same, I claim:

1. Apparatus for building tires comprising support means, axially spaced axially movable flanges on said support means, a tire carcass support bladder bridging the peripheries of said flanges, means to cause relative axial motion of said flanges in order to selectively bring them together or separate them, an axially movable bead setting ring adjustably mounted at the outer side of each flange and having a shoulder for receiving a tire bead and flipper assembly, and means for turning up carcass plies after beads have been set thereon comprising a back up plate slidably mounted on said support means between each of said flanges and the associated bead setting ring with the radially outer edge of each back-up plate disposed radially inwardly of the shoulder on the adjacent bead setting ring and with a portion of each back up plate adapted to contact the adjacent bead setting ring to determine the axially outer position of the back up plate, a separate inflatable tube nested in the space provided between each of said back up plates and the associated flange, inflation of said tubes with said bead setting rings retracted from the flanges causing said tubes to engage said back up plates with the bead setting rings whereupon the tubes expand radially outwardly between said back up plates and flanges to turn up a tire carcass ply around tire beads set against the portions of the carcass ply which were turned down around the edges of said flanges.

2. The method of building a tire having a circumferentially extensible carcass surrounded by a substantially circumferentially inextensible overhead comprising forming a carcass band of elastomer covered substantially axially extending reinforcing elements upon a cylindrical form with the edges of said band turned about bead core rings, applying strips of sidewall covering rubber to the said band with the adjacent edges of said strips spaced from each other a distance in the order of the width of the tread portion of the completed tire, shaping the carcass band to substantially the configuration of the completed tire, and applying a circumferentially inextensible overhead and tread rubber to the carcass band with the adjacent edges of said strips providing guides for centering the said overhead and the said tread rubber and with the edges of the tread rubber in contact with the adjacent edges of the sidewall strips.

3. The method of building a tire having a circumferentially extensible carcass surrounded by a substantially circumferentially inextensible overhead comprising forming a carcass band of elastomer covered substantially axially extending reinforcing elements upon a cylindrical form with the edges of said band turned about bead core rings, applying strips of sidewall covering rubber to the said band with the adjacent edges of said strips provided with shoulders spaced from each other a distance in the order of the width of the tread portion of the completed tire, shaping the carcass band to substantially the configuration of the completed tire, applying an overhead of inextensible reinforcing elements to said carcass with the edges of the overhead received upon the said shoulders of the adjacent edges of said sidewall strips, and applying tread rubber to the said overhead with the edges of the tread rubber extending beyond the edges of the overhead into contact with the sidewall strips.

4. Apparatus for building tires comprising rotatable support means, a pair of axially spaced side members with circular peripheries mounted for rotation with and axial movement on said support means, a flexible annular bladder bridging the peripheries of said side members, a pair of rigid annular members, means removably connecting one each of said rigid annular members to one each of said side members adjacent the periphery thereof with an edge of the bladder clamped therebetween in air-sealing relationship and the outer peripheries of said annular members projecting radially outwardly from the said bladder, a second flexible annular bladder, means for removably clamping the edges of the second bladder to said rigid annular members in air-sealing relationship adjacent the outer peripheries of the said rigid annular members thereby forming an inflation chamber between the said bladders with rigid generally radially extending sides provided by said annular members, and means to effect relative axial movement of said side members to and from positions selectively disposing said second bladder in substantially cylindrical or toroidal configuration.

5. An apparatus as defined in claim 4 further comprising separate inflatable annular tube means supported adjacent the outer side surface of each of said rigid annular members, means to supply air under pressure to said tube means, and rigid means supported adjacent the outer sides of said side members for axial movement relative thereto and cooperating with said inflatable tube means to cause the latter to move radially outwardly when inflated thereby effecting turn-up of the edges of the tire carcass ply stock placed on the said second bladder and extending beyond the edges of the latter.

6. Apparatus for building tires comprising a support sleeve adapted to be mounted on the shaft of a tire building machine, a pair of axially spaced side members with circular peripheries mounted for rotation with and axial movement on said sleeve, a flexible annular bladder bridging the peripheries of said side members, a pair of rigid annular members, means removably connecting one each of said rigid annular members to one each of said side members adjacent the periphery thereof with an edge of the bladder clamped therebetween in air-sealing relationship and the outer peripheries of said annular members projecting radially outwardly from said bladder, a second flexible annular bladder, means for removably clamping the edges of the second bladder to said rigid annular members in air-sealing relationship adjacent the outer peripheries of the said rigid members thereby forming an inflation chamber between said bladders with rigid generally radially extending sides provided by said annular members, and cooperating axially disposed screw and nut means on said sleeve and side members radially inwardly of the first-mentioned bladder for effecting relative axial movement of said side members to and from positions selectively disposing said second bladder in substantially cylindrical or substantially toroidal configuration.

7. The method of building a tire having a circumferentially extensible carcass surrounded by a substantially circumferential inextensible overhead comprising the steps of laying the carcass ply stock on an inflatable bladder while the surface of the bladder is substantially cylindrical, setting the beads upon the carcass adjacent the edges thereof, turning the edges of the carcass ply stock around the beads, applying rubber sidewall covering stock to portions of the carcass extending from the beads to the regions of the tread shoulders in the completed tire, lightly stitching the carcass and sidewall stock with the bladder lightly inflated and substantially cylindrical, bringing the edges of the bladder together while increasing the inflation pressure in the bladder to form the bladder and the carcass and sidewall stock thereon into toroidal form, applying the overhead and tread stock to the crown of the carcass with the edges of the sidewall stock providing guides for the application of the overhead and tread stock and with the latter extending into contact with the sidewall stock, and stitching the applied overhead and tread stock against the carcass while the latter remains upon the toroidally-shaped bladder.

8. The method of building a tire as defined in claim 7 wherein the turning of the edges of the carcass ply stock around the beads is effected uniformly and simultaneously about the entire circumference of the radially inner and axially outer surface of the bead regions.

9. A drum for building tires partially in cylindrical band form followed by completion after the tire bands have been shaped into a toroidal configuration, the said drum comprising a support sleeve adapted to be mounted on the shaft of a tire building machine and rotate therewith, a pair of axially spaced side members with circular peripheries mounted for rotation with and axial movement on said sleeve, a flexible annular bladder adapted to have a tire carcass built thereon bridging the peripheries of said side members and removably attached thereto in air sealing relationship, means to introduce air under pressure into the region between said side members and bladder, a screw extending axially of said drum through threaded portions of said side members radially intermediate said sleeve and bladder and effective when rotated to sequentially move said side members toward and from each other to positions which respectively dispose said bladder in substantially toroidal and substantially cylindrical configurations, and means to rotate said screw by the rotation of said building drum shaft comprising a planet gear fixed to said screw, a sun gear rotatable on said sleeve and meshing with said planet gear, and means to arrest motion of said sun gear while the sleeve rotates with said shaft.

10. Apparatus as defined in claim 6 and further comprising means to rotate said screw comprising a planet gear fixed to said screw, a sun gear rotatable on said sleeve and meshing with said planet gear, and means to arrest motion of said sun gear while the sleeve rotates.

References Cited in the file of this patent

UNITED STATES PATENTS

| | | |
|---|---|---|
| 2,084,009 | Sohl | June 15, 1937 |
| 2,182,176 | Maranville | Dec. 5, 1939 |
| 2,339,543 | Bishop | Jan. 18, 1944 |
| 2,521,143 | Benson | Sept. 5, 1950 |
| 2,565,071 | Frazier | Aug. 21, 1951 |
| 2,567,064 | Frazier | Sept. 4, 1951 |
| 2,614,951 | Iredell | Oct. 21, 1952 |
| 2,642,921 | Appleby | June 23, 1953 |
| 2,655,977 | Hodgkins | Oct. 20, 1953 |
| 2,715,931 | Frazier | Aug. 23, 1955 |
| 2,715,933 | Frazier | Aug. 23, 1955 |
| 2,717,628 | Wikle | Sept. 13, 1955 |
| 2,763,317 | Ostling | Sept. 18, 1956 |
| 2,814,330 | Vanzo | Nov. 26, 1957 |
| 2,935,117 | Pfeifer | May 3, 1960 |
| 2,951,526 | Haase | Sept. 6, 1960 |